United States Patent
Schneider et al.

(10) Patent No.: US 8,710,973 B2
(45) Date of Patent: Apr. 29, 2014

(54) AUTOMATIC ENGINE OIL LIFE DETERMINATION WITH A FACTOR FOR OIL QUALITY

(75) Inventors: Eric W. Schneider, Shelby Township, MI (US); Matthew J. Snider, Howell, MI (US); Robert M. Olree, Troy, MI (US); Eric R. Johnson, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 12/858,629

(22) Filed: Aug. 18, 2010

(65) Prior Publication Data

US 2012/0044065 A1 Feb. 23, 2012

(51) Int. Cl.
*B60Q 1/00* (2006.01)

(52) U.S. Cl.
USPC ....... 340/457.4; 340/3.71; 340/438; 340/603; 340/631; 340/439; 184/1.5; 184/6.4; 184/108; 184/6.1; 73/53.05; 73/114.01; 73/61.44; 73/53.07

(58) Field of Classification Search
USPC ................ 340/457.4, 59, 438, 603, 631, 439; 184/1.5, 6.4, 108, 6.1; 73/53.05, 73/114.55–56, 53.07; 123/196 S
See application file for complete search history.

(56) References Cited

U.S. PATENT DOCUMENTS

| 4,506,337 | A | * | 3/1985 | Yasuhara | 701/29.5 |
|---|---|---|---|---|---|
| 4,584,977 | A | * | 4/1986 | Lenk et al. | 123/196 S |
| 4,677,847 | A | * | 7/1987 | Sawatari et al. | 73/53.05 |
| 4,742,476 | A | * | 5/1988 | Schwartz et al. | 701/29.5 |
| 4,792,791 | A | * | 12/1988 | Cipris et al. | 340/603 |
| 5,382,942 | A | * | 1/1995 | Raffa et al. | 340/457.4 |
| 5,750,887 | A | * | 5/1998 | Schricker | 73/114.55 |
| 5,831,154 | A | * | 11/1998 | Guertler et al. | 73/114.56 |
| 6,253,601 | B1 | * | 7/2001 | Wang et al. | 73/114.55 |
| 6,266,587 | B1 | * | 7/2001 | Guertler et al. | 701/29.5 |
| 6,844,745 | B1 | | 1/2005 | Schachameyer et al. | |
| 6,920,779 | B2 | * | 7/2005 | Carlstrom et al. | 73/53.05 |
| 2004/0079589 | A1 | * | 4/2004 | Schneider | 184/1.5 |
| 2004/0093150 | A1 | * | 5/2004 | Arai et al. | 701/104 |
| 2010/0300188 | A1 | * | 12/2010 | Halalay et al. | 73/114.55 |

* cited by examiner

*Primary Examiner* — Benjamin C Lee
*Assistant Examiner* — Chico A Foxx
(74) *Attorney, Agent, or Firm* — Quinn Law Group, PLLC

(57) ABSTRACT

A method is provided for determining remaining oil life prior to an oil change in an internal combustion engine that uses a body of oil. The method includes transferring the body of oil to the engine and determining a volume of the transferred body of oil. The method also includes determining quality of the transferred body of oil and determining the remaining oil life based on the determined quality and volume of the body of oil. The method additionally includes activating an oil change indicator when the remaining oil life reaches a predetermined level. A system for determining a number of engine revolutions permitted on a volume of oil is also disclosed.

14 Claims, 3 Drawing Sheets

AUTOMATIC ENGINE OIL LIFE DETERMINATION WITH A FACTOR FOR OIL QUALITY

TECHNICAL FIELD

The present invention relates to a system for automatic engine oil life determination employing a factor for quality of oil.

BACKGROUND

In internal combustion engines, oil is typically used for lubrication, cleaning, inhibiting corrosion, to improve sealing, and to cool the engine by carrying heat away from the moving parts. Engine oils are generally derived from petroleum-based and non-petroleum synthesized chemical compounds. Modern engine oils are mainly blended by using base oil composed of hydrocarbons and other chemical additives for a variety of specific applications. Over the course of oil's service life, engine oil frequently becomes contaminated with foreign particles and soluble contaminants, and its chemical properties become degraded due to oxidation and nitration. A common effect of such contamination and degradation is that the oil may lose its capability to fully protect the engine, thus necessitating the used oil to be changed or replaced with clean, new oil.

Engine oil is generally changed based on time in service, or based on a distance the engine's host vehicle has traveled. Actual operating conditions of the vehicle and hours of engine operation are some of the more commonly used factors in deciding when to change the engine oil. Time-based intervals account for shorter trips where fewer miles are driven, while building up more contaminants. During such shorter trips, the oil may often not achieve full operating temperature long enough to burn off condensation, excess fuel, and other contamination that may lead to "sludge", "varnish", or other harmful deposits.

To aid with timely oil changes, modern engines often include oil life monitoring systems to estimate the oil's condition based on factors which typically cause degradation, such as engine speed and oil or coolant temperature. When an engine employing an oil life monitoring system is used in a vehicle, such a vehicle's total distance traveled since the last oil change may be an additional factor in deciding on the appropriate time for an oil change.

SUMMARY

A method is disclosed herein for determining remaining oil life prior to an oil change in an internal combustion engine that uses a body of oil. The method includes transferring the body of oil to the engine and determining a volume of the transferred body of oil. The method also includes determining quality of the transferred body of oil and determining the remaining oil life based on the determined quality and volume of the body of oil. The method additionally includes activating an oil change indicator when the remaining oil life reaches a predetermined level.

The method may additionally include resetting the oil change indicator to represent 100% of oil life remaining following the oil change. At least one of the acts of determining a volume of the transferred body of oil, determining the remaining oil life, and activating and resetting the oil life indicator may be accomplished via a controller arranged relative to and operatively connected to the engine.

The engine may include an oil sump arranged to accept the transferred body of oil. The act of determining a volume of the transferred body of oil may include determining a level of the transferred body of oil in the sump. The act of determining the remaining oil life may further include determining a number of revolutions for each combustion event of the engine and determining a number of combustion events permitted using the determined volume of oil.

The act of determining a level of quality of the volume of oil may be accomplished via a sensor positioned on the engine, or may be accomplished via accessing a look-up table. Such a look-up table may be programmed into the above-described controller.

A system for determining the remaining oil life permitted on a volume of oil is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
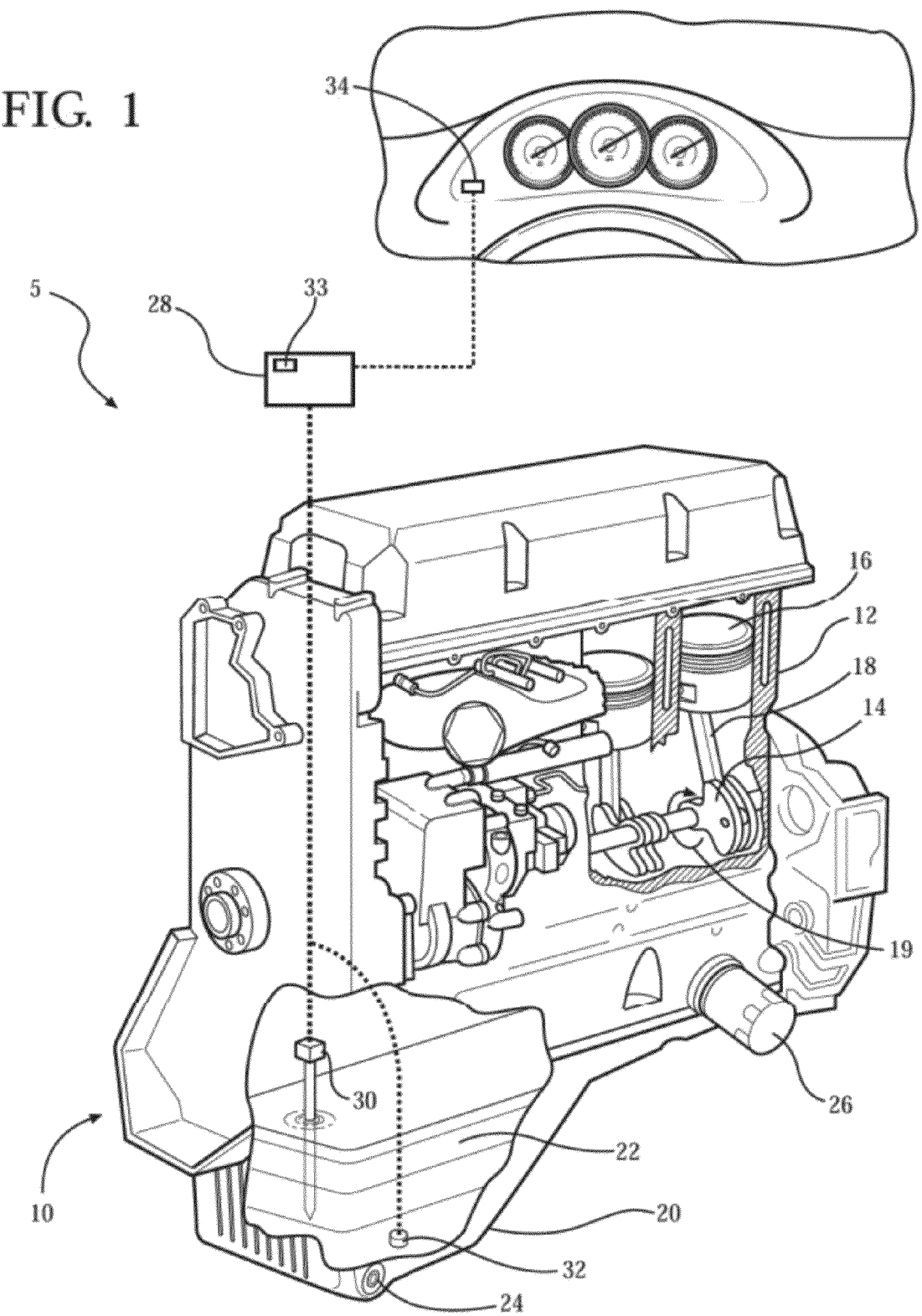
FIG. 1 is a schematic illustration of an engine oil life monitoring system.

Referring to the drawings wherein like reference numbers correspond to like or similar components throughout the several figures, FIG. 1 illustrates an automatic oil life system 5. Oil life system 5 is configured for determining remaining effective or useful life of oil utilized in an internal combustion engine prior to an oil change. The determining of the remaining oil life by oil life system 5 includes determining a number of permitted engine revolutions on a specific volume of oil.

Automatic oil life system 5 includes an internal combustion engine which is represented schematically and denoted by numeral 10. Engine 10 includes an engine block 12. Block 12 houses engine internal components such as a crankshaft 14, reciprocating pistons 16, and connecting rods 18. Pistons 16 are attached to crankshaft 14 via rods 18 to transfer the force of combustion to the crankshaft and thereby rotate the engine 10. Rotation of engine 10, which is typically measured in terms of revolutions per minute (RPM), is denoted by an arrow 19. Each connection between the respective pistons 16 and rods 18, and between the rods and crankshaft 14, includes an appropriate bearing (not shown) for smooth and reliable rotation.

Engine 10 also includes an oil pan or sump 20. Sump 20 is arranged on engine 10 and is attached to block 12 for holding a body of oil 22. Body of oil 22 is employed within engine 10 for lubricating engine's moving parts, such as bearings (not shown), pistons 16 and rods 18, and for other functions such as cooling the engine by carrying heat generated by friction and combustion away from the moving parts. Body of oil 22 additionally functions to remove contaminants from engine 10. Engine 10 additionally includes an oil filter 26 specifically configured to trap various foreign particles that the oil may collect while in service. In order to not restrict oil flow, filter 26 is generally capable of trapping particles down to only a certain size, and may thus fail to capture smaller contaminants. The body of oil 22 may also absorb soluble contaminants that are not removed by filter 26. Therefore, over time, body of oil 22 becomes chemically degraded due to oxidation and nitration, as well as contaminated with foreign materials, thus becoming less effective in its protection of engine 10, and necessitating the oil to be changed. Sump 20 includes a removable plug 24, which may be configured as a threadable fastener, for permitting body of oil 22 to be drained from the sump during an oil change.

Automatic oil life system 5 also includes a controller 28, and may include a first sensor 30 and a second sensor 32, as shown. Controller 28 may be a central processor configured to regulate operation of engine 10 or a dedicated unit programmed to solely operate the automatic oil life system. Sensor 30 is configured to sense a level or height of the body of oil 22, and second sensor 32 is configured to sense a quality of the oil. Controller 28 is in communication with first sensor 30, which is arranged on the engine 10 relative to the sump 20. First sensor 30 is at least partially immersed in body of oil 22 and is configured to sense the level of the oil present in sump 20, and communicate such data to controller 28. First sensor 30 may be configured to sense the level of body of oil 22 either while engine 10 is shut-off, or dynamically, i.e., while the engine is running.

Controller 28 is also operatively connected to second sensor 32, which is arranged in sump 20 in contact within body of oil 22. Second sensor 32 is configured to sense quality of the body of oil 22 present in sump 20, and communicate such data to controller 28. Second sensor 32 may be an electrochemical sensor configured to sense the resistivity and permittivity of the body of oil 22 between oil changes. Controller 28 receives data from each of the first sensor 30 and second sensor 32, and determines an appropriate time or instance for body of oil 22 to be changed, i.e., replaced with fresh oil.

The appropriate allowed number of engine revolutions before changing body of oil 22 is determined according to a mathematical relationship or algorithm $R(Rev)=K(Oil) \times K(Eng) \times V$, which is denoted by numeral 33. Mathematical relationship 33 is programmed and stored in the controller 28. R(Rev) represents a total number of engine revolutions permitted on a specific volume and quality of the body of oil 22. R(Rev) is also representative of a predetermined level of effective or useful life remaining in the body of oil 22 prior to necessitating an oil change. The factor K(Oil) represents a total number of allowed combustion events of engine 10 per liter of the body of oil 22, K(Eng) represents a number of revolutions of engine 10 for each combustion event of the engine, and V represents a volume in liters of the body of oil 22 present in sump 20. Total number of allowed combustion events per liter of the body of oil 22, K(Oil), is an input variable in relationship 33.

K(Oil) is determined empirically based on evaluation of various types and grades of oils for chemical degradation and contamination while the oil is subjected to durability testing in engine 10. Therefore, K(Oil) is related directly to the quality of the body of oil 22 being held in sump 20. For example, samples of a particular grade and/or type of oil are evaluated at regular intervals and a number of corresponding combustion events of engine 10 are recorded until the levels of degradation and/or contamination are deemed borderline unacceptable. Such a number of combustion events is then identified as K(Oil) for the particular grade and/or type of oil to be employed in relationship 33.

K(Eng) is a mathematical constant, the value of which depends on the actual engine configuration, with a specific number of cylinders. For example, in a six-cylinder, four-stroke engine, two complete engine revolutions are required for each cylinder to experience a single combustion event, i.e., K(Eng) is equal to 2 divided by 6 in the same example, and is therefore equal to a value of ⅓. V is a volume in liters of the body of oil 22 determined by the rated oil capacity of engine 10, which is typically indicated at the "full" mark on an oil level indicator or dipstick (not shown), or based on the oil level in sump 20 sensed by first sensor 30 after the oil change.

Subsequent to the determination of R(Rev) based on relationship 33, controller 28 executes a control action, such as activating or triggering an oil life indicator 34. Oil life indicator 34 is configured to signal to an operator of the engine or of the host vehicle when the number of engine revolutions permitted on the determined quality and volume of the body of oil 22, R(Rev) has been reached. The oil life indicator 34 may also display the percentage of oil life remaining. In order to assure that the operator is reliably notified when the time for oil change has arrived, oil life indicator 34 may be positioned on an instrument panel, inside the vehicle's passenger compartment. Oil life indicator 34 may be triggered immediately upon the determination that R(Rev) has been reached, or solely after R(Rev) has been reached when the engine is started and/or shut off. Following the oil change, oil life indicator 34 is reset to represent 100% oil life remaining, and the determination of R(Rev) on a fresh body of oil may commence.

Figure 2:
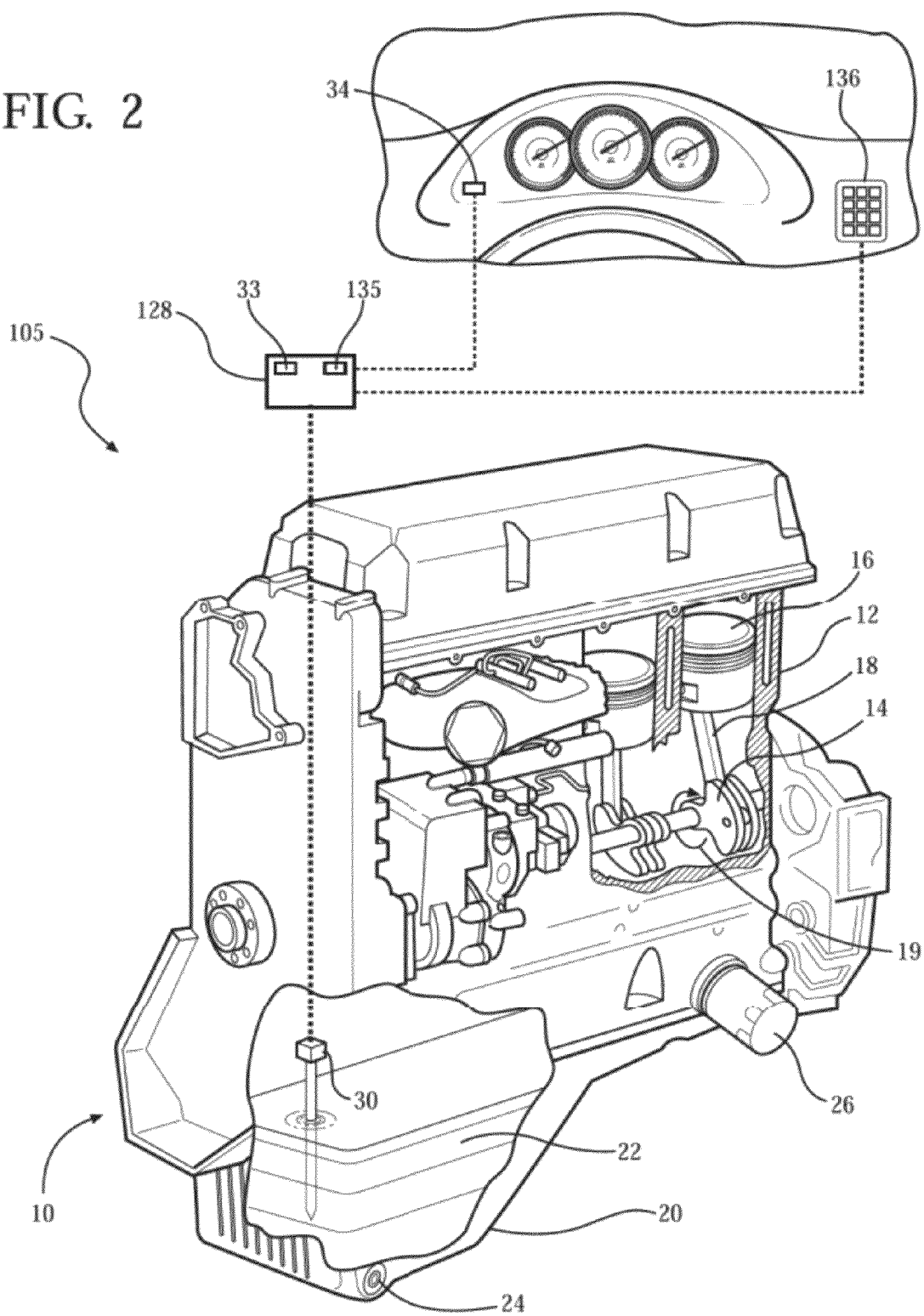
FIG. 2 is a schematic illustration of an alternative embodiment of the engine oil life monitoring system.

An alternative embodiment is a system 105 depicted in FIG. 2. System 105 is identical to system 5 in all respects, other than excluding second sensor 32, having a controller 128 in place of controller 28, and including an interface port 136. In addition to all the functions of controller 28 described above, controller 128 is programmed with a look-up table 135. The look-up table 135 includes information indicative of various types of oil and corresponding data for levels of quality of those oils, including the level of quality of the volume of the body of oil 22. The data for levels of quality of various oils in the look-up table 135 corresponds to specific types of oil.

Interface port 136 is configured to accept information indicative of the type of oil that gets introduced into sump 20 during an oil change. Interface port 136 is operatively connected with controller 128 for communicating to the controller information indicative of the type of oil introduced into sump 20. Inside controller 128, the communicated information is referenced against a corresponding level of quality for the type of oil recorded in the look-up table 135. Accordingly, based on the level of quality of the body of oil 22 accessed in the look-up table 135, controller 128 determines the factor K(Oil). Then, using relationship 33, controller 128 calculates the total number of engine revolutions permitted on a specific volume and quality of oil R(Rev).

Interface port 136 may be a keypad arranged in the passenger compartment or in the engine compartment of the subject vehicle to be used by an operator of the vehicle or an oil change service provider for entering the appropriate information indicative of the type of oil introduced into sump 20 during the oil change. Interface port 136 may also be an electronic link to controller 128 for communicating such information to the controller via the internet. The described electronic link may thereby be used by an entity authorized to service the subject vehicle, such as a vehicle dealership, to program the oil life indicator 34 to alert the vehicle operator regarding the proper time for the next oil change.

Figure 3:
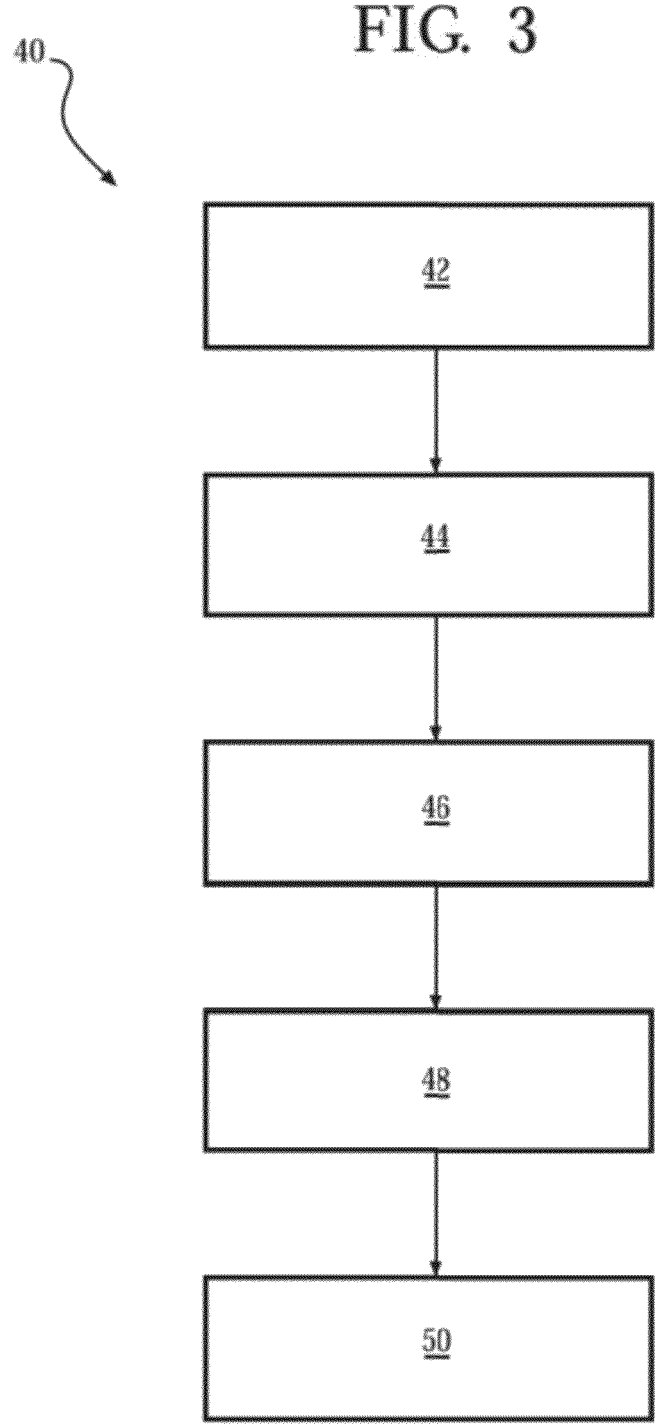
FIG. 3 is a flow chart illustrating a method for determining a number of engine revolutions permitted on a volume of oil in an internal combustion engine.

A method 40 for determining remaining oil life prior to an oil change is shown in FIG. 3, and described below with reference to the structure shown in FIGS. 1 and 2. Method 40 commences in frame 42 with transferring body of oil 22 to sump 20. Following frame 42, the method proceeds to frame 44, where it includes determining volume of oil V of the transferred body of oil 22, as described above with respect to FIG. 1. After frame 44, the method advances to frame 46, where it includes determining the quality of the body of oil 22.

The quality of the body of oil 22 may be determined either via the controller 28 of system 5 receiving a signal from second sensor 32, or via controller 128 of system 105 receiving a signal from the interface port 136 indicative of the type of oil that was transferred into sump 20. In system 5, the sensed quality of the body of oil 22 is used directly to compute the factor K(Oil) by the controller 28. In system 105, the type of oil signaled from the interface port 136 is referenced in the look-up table 135 against the corresponding level of quality for that type of oil to determine the factor K(Oil).

Following frame 46, the method proceeds to frame 48. In frame 48, the method includes determining when the remaining oil life reaches a predetermined level. The predetermined level of remaining oil life may be established according to the number of engine revolutions R(Rev), wherein R(Rev) is based on the determined quality and the determined volume of the body of oil 22 by using the relationship 33. Following frame 48, the method advances to frame 50, where it includes executing a control action, such as activating the oil life indicator 34, to signal to an operator of engine 10 or of the vehicle where the engine resides when the remaining oil life reaches the predetermined level. A continuous reading of the percentage of remaining useful oil life may also be provided.

While the best modes for carrying out the invention have been described in detail, those familiar with the art to which this invention relates will recognize various alternative designs and embodiments for practicing the invention within the scope of the appended claims.

The invention claimed is:

1. A method for determining remaining oil life prior to an oil change in an internal combustion engine that uses a body of oil, the method comprising:
transferring the body of oil to the engine;
determining a volume of the transferred body of oil;
determining a quality of the transferred body of oil via determining a type of oil transferred to the engine;
determining a number of revolutions for each combustion event of the engine and determining a number of combustion events permitted using the determined quality and volume of oil;
determining the remaining oil life based on the determined quality and volume of the body of oil, the determined number of revolutions for each combustion event of the engine, and the determined number of revolutions for each combustion event permitted;
activating an oil change indicator when the remaining oil life reaches a predetermined level;
wherein at least one of said determining a volume of the transferred body of oil, said determining the remaining oil life, and said activating the oil change indicator is accomplished via a controller operatively connected to the engine,
wherein determining the remaining oil life is defined as a number of engine revolutions permitted before changing the body of oil that is determined according to a mathematical relationship R(Rev)=K(Oil)×K(Eng)×V programmed into the controller,
wherein:
R(Rev) represents the number of engine revolutions permitted before changing the body of oil;
K(Oil) represents the number of combustion events permitted per unit volume of the transferred body of oil;
K(Eng) represents the number of revolutions for each combustion event of the engine; and
V represents the determined volume of the transferred body of oil.

2. The method of claim 1, further comprising resetting the oil change indicator to represent 100% of oil life remaining following the oil change.

3. The method of claim 2, wherein said resetting the oil change indicator is accomplished via the controller.

4. The method of claim 1, wherein the engine includes an oil sump arranged to accept the transferred body of oil, and said determining a volume of the transferred body of oil includes determining a level of the transferred body of oil in the sump.

5. The method of claim 1, wherein said determining a type of oil transferred to the engine is accomplished via accessing a look-up table.

6. A system for determining remaining oil life permitted prior to an oil change in an internal combustion engine that uses a body of oil, the system comprising:
an oil sump arranged on the engine to accept the body of oil;
a first sensor arranged on the engine and configured to provide a signal indicative of a volume of the body of oil in the sump;
an interface port configured to accept information indicative of a type of oil in the oil sump; and
a controller operatively connected to the first sensor and to the interface port and programmed to correlate the type of oil to a quality of the body of oil via accessing a look-up table to determine the permitted remaining oil life based on the volume and the quality of the body of oil in the sump;
wherein the controller is programmed with a number of combustion events permitted per the volume of the body of oil in the sump, and the controller additionally determines the permitted remaining oil life based on a number of engine revolutions permitted before changing the body of oil according to a mathematical relationship R(Rev)=K(Oil)×K(Eng)×V programmed into the controller,
wherein:
R(Rev) represents the number of engine revolutions permitted before changing the body of oil;
K(Oil) represents the number of combustion events permitted per unit volume of the transferred body of oil;
K(Eng) represents the number of revolutions for each combustion event of the engine; and
V represents the determined volume of the transferred body of oil.

7. The system of claim 6, further comprising an oil change indicator, wherein the controller is configured to activate the oil change indicator when the remaining oil life reaches a predetermined level.

8. The system of claim 7, wherein the oil change indicator is reset to represent 100% of oil life remaining following the oil change.

9. The system of claim 6, wherein the controller is programmed with a number of revolutions for each combustion event of the engine, and the controller additionally determines the remaining oil life based on the number of revolutions for each combustion event of the engine.

10. The system of claim 6, wherein the signal indicative of a volume of the body of oil is indicative of a level of the body of oil in the sump, and the controller determines the volume based on the level.

11. A method for determining a number of engine revolutions permitted prior to an oil change in an internal combustion engine that uses a body of oil, the method comprising:

transferring the body of oil to the engine;

determining a volume of the transferred body of oil;

accepting information indicative of a type of oil transferred to the engine;

correlating the type of oil to a quality of the transferred body of oil via accessing a look-up table;

determining a number of engine revolutions based on the determined quality and volume of the body of oil; and activating an oil change indicator when the number of engine revolutions reaches a predetermined level;

wherein at least one of said determining the volume of the transferred body of oil, said accepting information indicative of a type of oil transferred to the engine, said correlating the type of oil to a quality of the transferred body of oil, said determining the number of engine revolutions based on the determined quality and volume of the body of oil, and said activating the oil change indicator is accomplished via a controller operatively connected to the engine, wherein said determining the number of engine revolutions includes determining a number of revolutions for each combustion event of the engine, and further includes determining a number of combustion events permitted using the determined volume of oil;

wherein said determining the number of engine revolution is determined according to a mathematical relationship $R(Rev)=K(Oil) \times K(Eng) \times V$ programmed into the controller, wherein:

R(Rev) represents the number of engine revolutions permitted before changing the body of oil;

K(Oil) represents the number of combustion events permitted per unit volume of the transferred body of oil;

K(Eng) represents the number of revolutions for each combustion event of the engine; and V represents the determined volume of the transferred body of oil.

12. The method of claim 11, further comprising resetting the oil change indicator to represent 100% of oil life remaining following the oil change.

13. The method of claim 12, wherein said resetting the oil change indicator is accomplished via the controller.

14. The method of claim 11, wherein the engine includes an oil sump arranged to accept the transferred body of oil, and said determining a volume of the transferred body of oil includes determining a level of the transferred body of oil in the sump.

* * * * *